May 13, 1941.    K. R. HERMAN    2,241,665
POWER TRANSMISSION
Filed Dec. 24, 1938
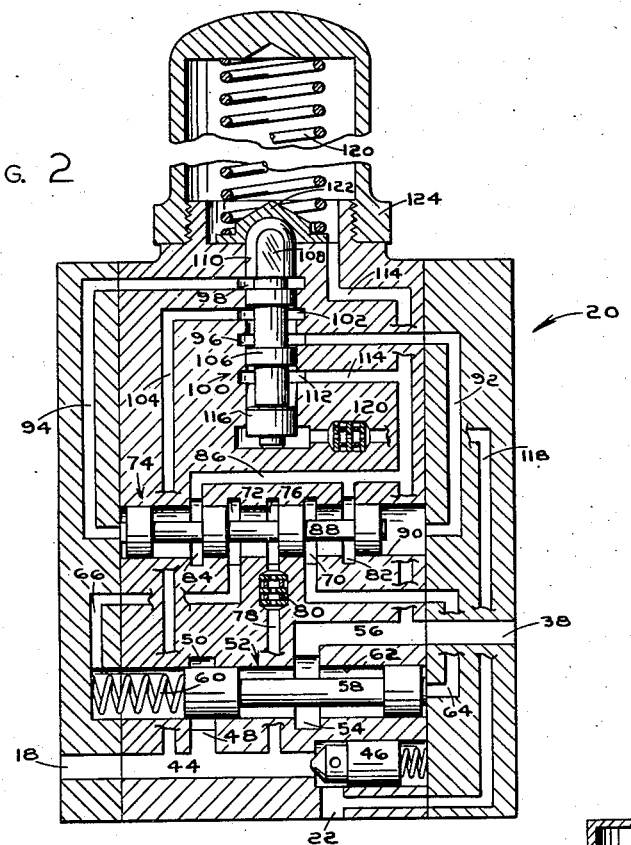
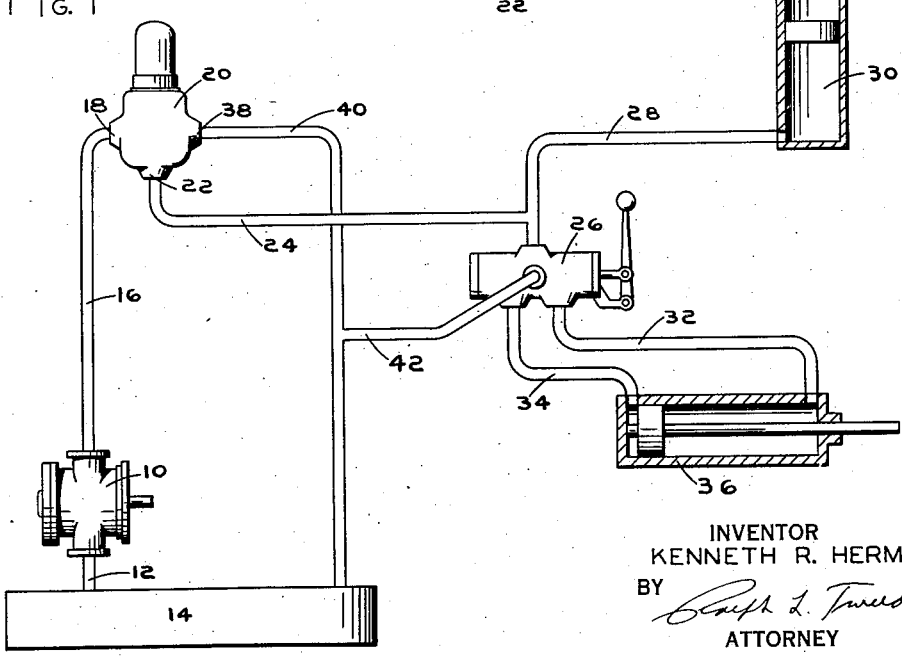
INVENTOR
KENNETH R. HERMAN
BY
ATTORNEY Patented May 13, 1941

2,241,665

UNITED STATES PATENT OFFICE 2,241,665

POWER TRANSMISSION

Kenneth R. Herman, Detroit, Mich., assignor to Vickers Incorporated, Detroit, Mich., a corporation of Michigan Application December 24, 1938, Serial No. 247,577

8 Claims. (Cl. 103—42)

This invention relates to power transmissions, particularly to those of the type comprising two or more fluid pressure energy translating devices one of which may function as a pump and another as a fluid motor.

The invention is particularly concerned with a power transmission system for use on aircraft for operating by power such movable parts as require too much effort for manual actuation, such as wing flaps, retractable landing gear, brakes, and indeed for operating any movable part which it may be desired to move. Due to space and weight limitations and to the intermittent use to which such a system is subjected, it is desirable to provide a common pump for supplying fluid pressure to operate the various fluid motors and to also provide an accumulator for not only permitting more rapid operation of a motor than would be otherwise permitted but also to form a reserve supply of oil under pressure capable of effecting operation of any or all of the motors in case of engine or pump failure.

One problem which has given considerable difficulty in the design of hydraulic systems of this character is that of providing suitable means for unloading the pump when the accumulator becomes filled so that power is not wasted in blowing oil over a relief valve at the full pressure developed in the accumulator. So far as applicant is aware, no unloading arrangement heretofore developed has proven entirely satisfactory for air craft service, among the difficulties being unreliability due to occasional failure of the unloading mechanism to reload the pump when demanded by emptying of the accumulator, inability to shift from fully unloaded condition to fully loaded condition without requiring a very large drop in pressure at the accumulator, and large weight and bulk.

It is an object of the present invention to provide an improved power transmission system in which the above difficulties are avoided and which in a simple compact light-weight mechanism provides positive unloading and reloading of the pump under the sole control of the accumulator pressure and which is effective on an extremely small pressure differential between unloading pressure and reloading pressure.

Further objects and advantages of the present invention will be apparent from the following description, reference being had to the accompanying drawing wherein a preferred form of the present invention is clearly shown.

In the drawing:

Figure 1 is a diagrammatic view of a power transmission system incorporating a preferred form of the present invention.

Figure 2 is a diagrammatic cross section of the unloading mechanism forming a part of the circuit illustrated in Figure 1.

The hydraulic circuit includes a pump 10 having a suction conduit 12 for withdrawing oil from a tank 14 and delivering it to a delivery conduit 16. The pump 10 may be driven by a suitable prime mover such as an aircraft engine or the like. Delivery conduit 16 connects to a port 18 of an unloading valve 20. The pressure delivery port 22 of the valve 20 is connected by a conduit 24 with the pressure port of a four-way valve 26.

A branch conduit 28 connects between the line 24 and an air-loaded accumulator indicated diagrammatically at 30. The cylinder ports of the valve 26 connect by conduits 32 and 34 with the opposite sides of a fluid motor 36 for operating any desired load device.

The unloading valve 20 also has a bypass port 38 connected by a conduit 40 with the tank 14. A branch conduit 42 connects the tank port of valve 26 with the conduit 40.

The internal construction of the unloading valve is illustrated diagrammatically in Figure 2. The port 18 connects by a conduit 44 with a check valve 46 the discharge side of which connects to the port 22. A branch 48 leads from the conduit 44 to a port 50 of an unloading valve generally designated as 52. The latter has a port 54 communicating by a conduit 56 with the bypass port 38. The spool 58 in its position illustrated closes communication between ports 48 and 54, thus causing the entire delivery of the pump to pass over check valve 46 to port 22. With the spool 58 shifted to the left communication is opened from conduit 44 to conduit 56 thus permitting the pump delivery to be bypassed. The spool 58 is biased to the right by a light spring 60.

For controlling shifting of the spool 58 the end chambers of the bore 62 in which the spool slides are connected by conduits 64 and 66 with the cylinder ports 70 and 72 of a four-way pilot valve generally designated as 74.

The valve 74 has a pressure port 76 which connects by a conduit 78 with the conduit 44. A restrictor 80 is preferably incorporated in this connection and may comprise a plurality of apertured disks assembled between annular separators as shown. Tank ports 82 and 84 connect with the conduit 56 by a branch conduit 86. The spool 88 is arranged to be shifted by pressure admitted to the end chambers of the bore 90 in which the spool 88 is slidable. For this purpose conduits 92 and 94 connect with the cylinder ports 96 and 98 of a four-way pilot valve 100 the pressure port 102 of which communicates with the conduit 44 by a branch connection 104.

Valve 100 has a spool 106 having a hemispherical upper end provided with diametrically opposite flats 108 for passage of fluid from the port 98 to the open end of the bore 110 in which the spool 106 is slidable. A tank port 112 and the space above the open end of bore 110 are connected to conduit 56 by a branch conduit 114. The pilot valve 100 is arranged to operate as a pressure responsive valve by the provision of a piston 116 at the lower end of the bore 110 which is connected to the port 22 by a branch conduit 118. The latter has a restrictor 120 therein. The spool 106 and piston 116 are biased downwardly by a spring 120 resting on a spring plate 122 which seats on the hemispherical upper end of the spool 106. A spring housing 124 is secured to the top portion of the body of valve 20.

In operation, oil is withdrawn by the pump 10 from the tank 14 through the suction conduit 12 and delivered to conduit 16 and port 18 of valve 20. If the pressure in accumulator 30 is below a predetermined value, the full delivery of the pump passes through the unloading valve 20 and over the check valve 46 through conduit 24 to the pressure port of valve 26 and through line 28 to the accumulator 30. If either the valve 26 is in its closed position, blocking fluid from both conduits 32 and 34, or if the fluid motor 36 is stalled by having moved the load to its extreme position, oil will be delivered by the pump to the accumulator 30 filling the same until the pressure therein reaches a predetermined maximum. When this pressure is reached, the unloading valve 20 opens the bypass to port 38 and through conduit 40 to tank, thus bypassing the pump delivery while the check valve 46 prevents back flow from the line 24 to tank. There is thus maintained a supply of oil under pressure in the accumulator 30 for effecting rapid operation of the motor 36.

The showing of valve 20 in Figure 2 represents the position of the parts when the accumulator is not filled and the pump delivery is passing over the check valve 46 to the port 22. As soon as the maximum pressure is reached in the accumulator this pressure is transmitted through conduit 118 and restrictor 120 to the piston 116 which is then able to overcome the force of spring 120 lifting spool 106 to admit pressure oil from conduit 44 through connection 104, ports 102 and 98, and conduit 94 to the left-hand end of pilot valve 74.

The spool 88 accordingly shifts discharging oil from the right-hand end through connection 92, ports 96 and 112, and conduit 114 to tank connection 38. The shifting of pilot valve 74 admits pressure oil from conduit 44 through branch connection 78, ports 76 and 70, and conduit 64 to the right-hand end of unloading valve 52.

The spool 58 is accordingly shifted to the left against the bias of spring 60 until port 48 opens to port 54. Oil discharged from the left end of valve 52 returns to tank through conduit 66, ports 72 and 84, conduits 86 and 56. As soon as unloading valve 52 cracks open, the pump delivery will be bypassed through connection 48, ports 50 and 54, and conduit 56 to tank. The spool 58 cannot shift completely to the left, however, because as soon as the port 50 is opened so wide as to permit the pressure in line 44 to fall below the value that must be maintained in the right end of bore 62 to balance the force of spring 60, no further movement of the spool 58 to the left can occur. The unloading valve thus automatically maintains an opening sufficient to keep a small pressure in the line 44 for actuating the valves 74 and 52.

As soon as the pressure in the accumulator 30 falls, due to use in operating the motor 36, the spring 120 is able to overcome the pressure exerted on piston 116 permitting the spool 106 to drop to the position illustrated thus admitting pressure from line 44 through connection 104, ports 102 and 96, and conduit 92 to the right-hand end of bore 90. The spool 88 accordingly shifts to the left discharging oil from the left end of bore 90 through conduit 94, port 98, across the flats 108, and through conduit 114 to tank. Shifting of the spool 88 admits pressure oil from conduit 44 through connection 78, ports 76 and 72, and connection 66 to the left end of unloading valve 52. The valve is then positively shifted to the right closing the bypass and discharging oil from the right end through conduit 64, ports 70 and 82, and conduit 86 to tank. The parts are thus returned to the position shown on the drawing.

While the form of embodiment of the invention, as herein disclosed, constitutes a preferred form, it is to be understood that other forms might be adopted, all coming within the scope of the claims which follow.

What is claimed is as follows:

1. In a fluid power transmission for driving an intermittently operating fluid motor, the combination of a continuously running pump, a supply connection from the pump to the motor, an accumulator in the supply connection, means between the pump and the accumulator for preventing flow from the accumulator toward the pump, a bypass between the pump and said means, an unloading valve for opening and closing the bypass, fluid motor means for shifting the unloading valve, a pilot valve for controlling said motor means, fluid motor means for shifting the pilot valve, a spring loaded piston exposed to pressure in the supply line between said flow preventing means and the fluid motor, and a pilot valve operated by the piston for controlling the second mentioned fluid motor means.

2. In a fluid power transmission for driving an intermittently operating fluid motor, the combination of a continuously running pump, a supply connection from the pump to the motor, an accumulator in the supply connection, means between the pump and the accumulator for preventing flow from the accumulator toward the pump, a bypass between the pump and said means, an unloading valve for opening and closing the bypass, fluid motor means for shifting the unloading valve in opposite directions, a pilot valve for controlling said motor means, fluid motor means for shifting the pilot valve, a spring loaded piston exposed to pressure in the supply line between said flow preventing means and the fluid motor, a pilot valve operated by the piston for controlling the second mentioned fluid motor means, and a light spring for biasing the unloading valve to closed position.

3. In a fluid power transmission for driving an intermittently operating fluid motor, the combination of a continuously running pump, a supply connection from the pump to the motor, an accumulator in the supply connection, means between the pump and the accumulator for preventing flow from the accumulator toward the pump, a bypass between the pump and said means, an unloading valve for opening and closing the bypass, fluid motor means for shifting the unloading valve, a pilot valve for controlling said motor means, fluid motor means for shifting the pilot valve, a spring loaded piston exposed to pressure in the supply line between said flow preventing means and the fluid motor, a pilot valve operated by the piston for controlling the second mentioned fluid motor means, and a restriction between the piston and the supply line.

4. In a fluid power transmission for driving an intermittently operating fluid motor, the combination of a continuously running pump, a supply connection from the pump to the motor, an accumulator in the supply connection, means between the pump and the accumulator for preventing flow from the accumulator toward the pump, a bypass between the pump and said means, an unloading valve for opening and closing the bypass, fluid motor means for shifting the unloading valve, a pilot valve for controlling said motor means, fluid motor means for shifting the pilot valve, a spring loaded piston exposed to pressure in the supply line between said flow preventing means and the fluid motor, a pilot valve operated by the piston for controlling the second mentioned fluid motor means, and connections for supplying fluid to operate both said motor operated means from the supply line, one of said connections being restricted and the other unrestricted.

5. In a fluid power transmission for driving an intermittently operating fluid motor, the combination of a continuously running pump, a supply connection from the pump to the motor, an accumulator in the supply connection, means between the pump and the accumulator for preventing flow from the accumulator toward the pump, a bypass between the pump and said means, an unloading valve for opening and closing the bypass, fluid motor means for shifting the unloading valve, a pilot valve for controlling said motor means, fluid motor means for shifting the pilot valve, means responsive to the pressure in the supply line between said flow preventing means and the accumulator for controlling the pilot valve, a connection for supplying fluid to operate the unloading valve from the supply line between the pump and the bypass, and means for maintaining a small pressure in said connection during unloading of the pump.

6. In a fluid power transmission for driving an intermittently operating fluid motor, the combination of a continuously running pump, a supply connection from the pump to the motor, an accumulator in the supply connection, means between the pump and the accumulator for preventing flow from the accumulator toward the pump, a bypass between the pump and said means, an unloading valve for opening and closing the bypass, fluid motor means for shifting the unloading valve, a pilot valve for controlling said motor means, fluid motor means for shifting the pilot valve, means responsive to the pressure in the supply line between said flow preventing means and the accumulator for controlling the pilot valve, and a connection for supplying fluid to operate the unloading valve from the supply line between the pump and the bypass, said unloading valve being biased to maintain a small pressure in said connection during unloading of the pump.

7. In a fluid power transmission for driving an intermittently operating fluid motor, the combination of a continuously running pump, a supply connection from the pump to the motor, an accumulator in the supply connection, means between the pump and the accumulator for preventing flow from the accumulator toward the pump, a bypass between the pump and said means, an unloading valve for opening and closing the bypass, a pressure responsive element connected with the accumulator and responsive to pressure changes therein, and means controlled by said pressure responsive element for governing the rate of change of opening or closing movement of the unloading valve, said means operating on a predetermined increase in accumulator pressure to impart a predetermined opening acceleration to the unloading valve and upon a predetermined decrease to impart a predetermined closing acceleration thereto.

8. In a fluid power transmission for driving an intermittently operating fluid motor, the combination of a continuously running pump, a supply connection from the pump to the motor, an accumulator in the supply connection, means between the pump and the accumulator for preventing flow from the accumulator toward the pump, a bypass between the pump and said means, an unloading valve for opening and closing the bypass, a pressure responsive element connected with the accumulator and responsive to pressure changes therein, means controlled by said pressure responsive element for governing the rate of change of opening or closing movement of the unloading valve, said means operating on a predetermined increase in accumulator pressure to impart a predetermined opening acceleration to the unloading valve and upon a predetermined decrease to impart a predetermined closing acceleration thereto, and means yieldably biasing said unloading valve toward closed position at all times.

KENNETH R. HERMAN.